United States Patent
Masuda et al.

(10) Patent No.: US 11,380,934 B2
(45) Date of Patent: Jul. 5, 2022

(54) METHOD FOR PRODUCING SOLID ELECTROLYTE HAVING ARGYRODITE TYPE CRYSTAL STRUCTURE

(71) Applicant: IDEMITSU KOSAN CO., LTD., Chiyoda-ku (JP)

(72) Inventors: Naoya Masuda, Sodegaura (JP); Junpei Maruyama, Sodegaura (JP); Hironari Kimpara, Sodegaura (JP); Shota Totsuka, Sodegaura (JP); Atsushi Yao, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 391 days.

(21) Appl. No.: 16/702,654

(22) Filed: Dec. 4, 2019

(65) Prior Publication Data
US 2020/0185767 A1    Jun. 11, 2020

(30) Foreign Application Priority Data

Dec. 5, 2018    (JP) .............................. JP2018-228521

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
None
See application file for complete search history.

(56) References Cited

U.S. PATENT DOCUMENTS

| | | |
|---|---|---|
| 2010/0290969 A1 | 11/2010 | Deiseroth et al. |
| 2016/0156064 A1 | 6/2016 | Miyashita et al. |
| 2017/0222257 A1 | 8/2017 | Miyashita et al. |
| 2017/0352916 A1 | 12/2017 | Miyashita et al. |
| 2019/0074542 A1* | 3/2019 | Makino .................... C03C 3/32 |

FOREIGN PATENT DOCUMENTS

| | | |
|---|---|---|
| JP | 2010-540396 A | 12/2010 |
| JP | 2016-024874 A | 2/2016 |
| WO | WO 2015/011937 A1 | 1/2015 |

(Continued)

OTHER PUBLICATIONS

Yobuchi et al. "Preparation of high lithium-ion conducting Li6PS5Cl solid electrolyte from ethanol solution for all-solid-state lithium batteries"; Journal of Power Sources 293 (2015), pp. 941-945; available online Jun. 14, 2015. (Year: 2015).*

(Continued)

*Primary Examiner* — Gregg Cantelmo
(74) *Attorney, Agent, or Firm* — Oblon, McClelland, Maier & Neustadt, L.L.P.

(57) ABSTRACT

A method for producing a solid electrolyte having an argyrodite-type crystal structure, the method comprising:
heat-treating a raw material mixture comprising lithium, sulfur, phosphorus and halogen in a solvent using a pressure-resistant container or under refluxing;
removing the solvent; and
firing a treated product obtained by the heat treatment.

12 Claims, 4 Drawing Sheets

(56) References Cited

FOREIGN PATENT DOCUMENTS

| WO | WO 2015/012042 A1 | 1/2015 |
| WO | WO 2016/104702 A1 | 6/2016 |

OTHER PUBLICATIONS

Zhou et al.: "Solvent-Engineered Design of Argyrodite Li6PS5X (X=Cl, Br, I) Solid Electrolytes with High Ionic Conductivity"; ACS Energy Lett. 2019, 4, pp. 265-270 (published Nov. 20, 2018). (Year: 2018).*

Choi et al.; "Application of Rod-Like Li6PS5Cl Directly Synthesized by a Liquid Phase Process to Sheet-Type Electrodes for All-Solid-State Lithium Batteries"; Journal of the Electrochemical Society, 166 (3) A5193-A5200 (2019); published Dec. 19, 2019. (Year: 2019).*

Ukawa, Y, et al., "Characterization of argyrodite-type $Li_6PS_5Cl_{1-x}Br_x$ solid electrolytes" 82th proceedings of the Electrical Engineers of Japan, 2015, 2HO8, 3 pages (with English Translation).

Yubuchi, S, et al., "Synthesis of Sulfide-Based Solid Electrolytes and Construction of the Interfaces in Bulk-Type All-Solid-State Batteries Using Liquid-Phase Techniques" Journal of the Japan Society of Colour Material, vol. 89, issue 9, 2016, 3 pages (with English Abstract).

\* cited by examiner

METHOD FOR PRODUCING SOLID ELECTROLYTE HAVING ARGYRODITE TYPE CRYSTAL STRUCTURE

TECHNICAL FIELD

The embodiments described in the present specification relates generally to a method for producing a solid electrolyte having an argyrodite-type crystal structure.

BACKGROUND ART

With the rapid spread of information-related equipments or communications equipments such as personal computers, video cameras, and mobile phones in recent years, the development of batteries used as a power source thereof has been considered to be important. Among these batteries, a lithium ion battery has attracted an attention in terms of its high energy density.

In the lithium ion battery that is currently commercially available, a liquid electrolyte containing a flammable organic solvent is used, and therefore, it is required to attach of a safety device that suppresses an increase of a temperature at the time of short circuit, or to make improvements in structural and material aspects for preventing short circuit. On the other hand, in the lithium ion battery formed into an all-solid-state battery by using a solid electrolyte in place of the liquid electrolyte, the flammable organic solvent is not used in the battery, and therefore, it is considered that the safety device can be simplified, and a production cost or productivity is excellent.

A sulfide solid electrolyte is known as a solid electrolyte used for a lithium ion battery. Various crystal structures of the sulfide solid electrolyte are known, and a stable crystal structure whose structure is hardly changed over a wide temperature range is suitable in terms of expanding the operating temperature range of the battery. As such a sulfide solid electrolyte, for example, a sulfide solid electrolyte having an argyrodite-type crystal structure (which may hereinafter be referred to as an argyrodite-type solid electrolyte) has been developed.

As a method for producing an argyrodite-type solid electrolyte, for example. Patent Document 1 describes a method in which a raw material is heated at 550° C. for 6 days, and then gradually cooled. Patent Documents 2 to 5 describe a method in which raw materials are pulverized and mixed in a ball mill for 15 hours and then heat-treated at 400 to 650° C. In addition, Non-Patent Document 1 describes a method of mechanically milling a raw material with a planetary ball mill for 20 hours, and then heat-treating the material at 550° C. Further, Non-Patent Document 2 discloses that a $Li_6PS_5Br$ crystal can be synthesized by dissolving $Li_2S$, LiBr and $Li_3PS_4$ in ethanol as a solvent, progressing a reaction in the solution, and then distilling off the solvent at 150° C.

Furthermore, Patent Document 6 discloses a method of crystallizing sulfide-based glass by heating a mixture of sulfide-based glass and a solvent which does not react with the sulfide-based glass in a pressure-resistant sealed container, as a method for producing sulfide-based crystallized glass which can be synthesized at a relatively lower temperature than argyrodite.

RELATED ART DOCUMENTS

Patent Documents

[Patent Document 1] JP 2010-540396 A
[Patent Document 2] WO 2015/011937
[Patent Document 3] WO 2015/012042
[Patent Document 4] JP 2016-24874 A
[Patent Document 5] WO 2016/104702
[Patent Document 6] JP 2010-241643 A Non-Patent Document

[Non-Patent Document 1] Abstracts of the 82nd Meeting of the Electrochemical Society of Japan (2015), 2H08
[Non-Patent Document 2] J. Jpn. Soc. Colour Mater., 89[9], 300-305 (2016)

SUMMARY OF THE INVENTION

In the conventional producing method including the step of heat treatment at a high temperature, particles grow large, and therefore, for example, a fine solid electrolyte suitable for a solid electrolyte layer having a thickness on the order of submicron cannot be obtained. The particle size of the solid electrolyte has a large influence on a battery using the solid electrolyte (for example, an all-solid lithium ion battery). For example, if the particles of the solid electrolyte become coarse at the time of production or use of the battery, a short circuit is caused. In some cases, the battery itself cannot be produced. Therefore, the particle size may be more important than the ionic conductivity.

In addition, when the heat treatment is performed at a low temperature in order to suppress the growth of particles, there has been a problem that impurities such as unreacted raw materials tend to remain in the solid electrolyte. LiBr also remains in the solid electrolyte obtained by the method of Non-Patent Document 2. The presence of the residual raw material may reduce the ionic conductivity. In addition, since lithium halide absorbs water, the water-resistance of the solid electrolyte may be lowered.

An object of the present invention is to provide a method for producing an argyrodite-type solid electrolyte having a small particle size and a high ionic conductivity, and having a less amount of the residual raw material.

According to an embodiment of the present invention, provided is a method for producing a solid electrolyte having an argyrodite-type crystal structure, the method comprising:

heat-treating a raw material mixture comprising lithium, sulfur, phosphorus and halogen in a solvent using a pressure-resistant container or under refluxing;

removing the solvent; and firing a treated product obtained by the heat treatment.

According to an embodiment of the present invention, it is possible to provide a method for producing an argyrodite-type solid electrolyte having a small particle size and a high ionic conductivity, and having a less amount of the residual raw material.

MODE FOR CARRYING OUT THE INVENTION

A method for producing an argyrodite-type solid electrolyte according to an embodiment of the present invention comprises the following three steps.

Step 1: Heat-treating (calcinating) a raw material mixture comprising lithium, sulfur, phosphorus and halogen in a solvent using a pressure-resistant container or under refluxing.

Step 2: Removing the solvent.

Step 3: Firing the treated product obtained by the heat treatment.

Figure 1:
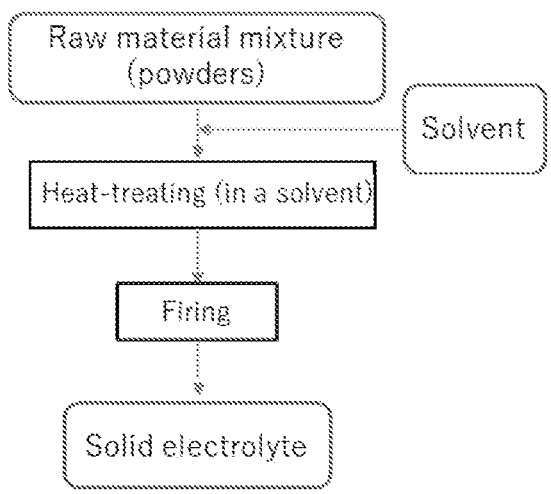
FIG. 1 is a flow diagram of an exemplary producing method according to an embodiment of the present invention.

FIG. 1 is a flow diagram of an exemplary producing method according to the present embodiment.

As shown in FIG. 1, in the present embodiment, the raw material mixture is heat-treated in a solvent. By heat-treating in a solvent, the raw material mixture forms a treated product (an intermediate), and the heating time for subsequent firing can be shortened, so that a solid electrolyte having an argyrodite-type crystal structure can be produced while suppressing particle growth. Specifically, a fine seed crystal, that is, a crystal containing a $PS_4$ structure which is the main structure in an argyrodite-type crystal structure, is formed by first heating (heat treatment), and halogen is taken into the crystal by second heating (firing) to obtain an argyrodite-type crystal structure.

Further, in the present embodiment, not only the particle growth of the primary particles but also the particle growth of the secondary particles due to the aggregation of the primary particles can be suppressed. Depending on the degree of aggregation, it may be difficult to disintegrate into primary particles. As a result, energy is required for disintegration, and the ionic conductivity decreases with the disintegrating. In the present embodiment, since the particles are difficult to grow at the time of firing, it is possible to stably obtain a fine solid electrolyte.

As the raw material mixture, two or more kinds of raw material compounds and/or simple substances are used in combination such that the raw material mixture comprises the constituent elements of the argyrodite-type solid electrolyte as a whole.

As the compound of the raw material which is a component of the raw material mixture, a compound having one or more of lithium, sulfur, phosphorus and halogen as the constituent elements can be used.

Examples of the compound containing lithium include, for example, lithium sulfide ($Li_2S$), lithium oxide ($Li_2O$), and lithium carbonate ($Li_2CO_3$). Among these, lithium sulfide is preferable.

Examples of the compound containing phosphorus include, for example, phosphorus sulfides such as diphosphorus trisulfide ($P_2S_3$), diphosphorus pentasulfide ($P_2S_5$), and the like, and phosphorus compounds such as sodium phosphate ($Na_3PO_4$) and the like. Among them, phosphorus sulfide is preferable, and diphosphorus pentasulfide is more preferable.

Examples of the compound containing halogen include, for example, a compound represented by the general formula ($M_l$-$X_m$).

In the formula, M represents sodium (Na), lithium (Li), boron (B), aluminum (Al), silicon (Si), phosphorus (P), sulfur (S), germanium (Ge), arsenic (As), selenium (Se), tin (Sn), antimony (Sb), tellurium (Te), lead (Pb), bismuth (Bi), or a substance to which an elemental oxygen or an elemental sulfur is bonded with the listed element. M is preferably Li or P, and in particular, lithium (Li) is preferable.

X is a halogen selected from the group consisting of F, Cl, Br, and I.

In addition, l is an integer of 1 or 2, and m is an integer of 1 to 10. When m is an integer of 2 to 10, that is, when a plurality of Xs are present, Xs may be the same or different. For example, in the case of $SiBrCl_3$ mentioned later, m is 4, and Xs are different elements, i.e. Br and Cl.

Examples of the halogen compound represented by the above-mentioned formula include sodium halide such as NaI, NaF, NaCl, and NaBr; lithium halide such as LiF, LiCl, LiBr, and LiI; boron halide such as $BCl_3$, $BBr_3$, and $BI_3$; aluminum halide such as $AlF_3$, $AlBr_3$, $AlI_3$, and $AlCl_3$; silicon halide such as $SiF_4$, $SiCl_4$, $SiCl_3$, $Si_2Cl_6$, $SiBr_4$, $SiBrCl_3$, $SiBr_2Cl_2$, and $SiI_4$; phosphorus halide such as $PF_3$, $PF_5$, $PCl_3$, $PCl_5$, $PSCl_3$, $POCl_3$, $PBr_3$, $PSBr_3$, $PBr_5$, $POBr_3$, $PI_3$, $PSI_3$, $P_2Cl_4$, and $P_2I_4$; sulfur halide such as $SF_2$, $SF_4$, $SF_6$, $S_2F_{10}$, $SCl_2$, $S_2Cl_2$, and $S_2Br_2$; germanium halide such as $GeF_4$, $GeCl_4$, $GeBr_4$, $GeI_4$, $GeF_2$, $GeCl_2$, $GeBr_2$, and $GeI_2$; arsenic halide such as $AsF_3$, $AsCl_3$, $AsBr_3$, $AsI_3$, and $AsF_5$; selenium halide such as $SeF_4$, $SeF_6$, $SeCl_2$, $SeCl_4$, $Se_2Br_2$, and $SeBr_4$; tin halide such as $SnF_4$, $SnCl_4$, $SnBr_4$, $SnI_4$; $SnF_2$, $SnCl_2$, $SnBr_2$, and $SnI_2$; antimony halide such as $SbF_3$, $SbCl_3$, $SbBr_3$, $SbI_3$, $SbF_5$, and $SbCl_5$; tellurium halide such as $TeF_4$, $Te_2F_{10}$, $TeF_6$, $TeCl_2$, $TeCl_4$, $TeBr_2$, $TeBr_4$, and $TeI_4$; lead halide such as $PbF_4$, $PbCl_4$, $PbF_2$, $PbCl_2$, $PbBr_2$, and $PbI_2$; bismuth halide such as $BiF_3$, $BiCl_3$, $BiBr_3$, and $BiI_3$.

Among these, lithium halide or phosphorus halide is preferable, and LiCl, LiBr, LiI or $PBr_3$ is more preferable, LiCl, LiBr or LiI is still more preferable, and LiCl or LiBr is particularly preferable.

One of the kinds of the above-mentioned halogen compounds may be used alone, or a combination of two or more kinds thereof may be used.

Examples of the simple substance constituting the raw material mixture include a lithium metallic simple substance, a phosphorus simple substance such as red phosphorus, or a sulfur simple substance.

The above-mentioned compound and the simple substance can be used without any particular limitation as long as they are industrially manufactured and sold. It is preferable that the compound and the simple substance have a high purity.

The above-mentioned compound and/or simple substance is used in combination of two or more kinds such that the raw material mixture contains an element each of lithium, phosphorus, sulfur, and optionally halogen and the like as a whole.

In one embodiment of the present invention, the raw material mixture contains a lithium compound, a phosphorus compound, and a halogen compound, and at least one of the lithium compound and the phosphorus compound preferably contains an elemental sulfur, more preferably a combination of $Li_2S$, phosphorus sulfide, and lithium halide, and still more preferably a combination of $Li_2S$, $P_2S_5$, and LiCl and/or LiBr. It is preferable that the raw material mixture contain two or more kinds of halogen.

For example, when $Li_2S$, $P_2S_5$, LiCl, and LiBr are used as the raw material of the argyrodite-type solid electrolyte, the molar ratio of each compound may be set to $Li_2S$:$P_2S_5$:the sum of LiCl and LiBr=30 to 60:10 to 25:15 to 50. Preferably, $Li_2S$:$P_2S_5$: the sum of LiCl and LiBr=45 to 55:10 to 15:30 to 50, more preferably $Li_2S:P_2S_5$: the sum of LiCl and LiBr=45 to 50:11 to 14:35 to 45, and still more preferably $Li_2S:P_2S_5$: the sum of LiCl and LiBr=46 to 49:11 to 13:38 to 42.

In one embodiment, the volume-based mean particle size of the compound and the simple substance is set to preferably 20 μm or less in advance, more preferably 15 μm or less, and particularly preferably 12 μm or less.

The volume-based mean particle size (D50) is measured by laser diffraction type particle size distribution measurement. The lower limit of the volume-based mean particle size is usually about 100 nm.

As the device used for pulverizing the raw material, a high-speed rotary pulverizer, an impact type pulverizer, a container drive type mill, a medium stirring mill, or a jet mill can be used, and for example, a pin mill as a high-speed rotary pulverizer, a pulverizer as an impact type pulverizer, a ball mill as a container drive type mill, and a bead mill as a medium stirring mill can be given. Among them, a pin mill is preferable because the processing time is short and the pulverizing operation can be continuously performed. The processing time of the pin mill is about several seconds, which is extremely short.

The compound and the simple substance may be individually pulverized or pulverized after mixing.

In one embodiment of the present invention, it is preferable to coarsely mix the compound and the simple substance in advance. A container rotation type mixer, a container fixed type mixer, a mortar, or the like can be used for the coarsely mixing. For example, a Nauta mixer which is a conical screw type mixer, an FM mixer which is a high-speed stirrer/mixer, or the like can be used.

The raw material is mixed and pulverized, for example, in a solvent, and the obtained raw material mixture is heat-treated to obtain a treated product.

As the solvent, an organic solvent can be used, and preferably, a nonpolar solvent, a polar solvent, or a mixed solvent thereof can be used. Preferably, the solvent is a nonpolar solvent, or a solvent containing a nonpolar solvent as a main component, for example, a solvent 95% by weight or more of which is a nonpolar solvent.

As the nonpolar solvent, a hydrocarbon-based solvent is preferable. As the hydrocarbon-based solvent, a saturated hydrocarbon, an unsaturated hydrocarbon, or an aromatic hydrocarbon can be used.

Examples of the saturated hydrocarbon include hexane, pentane, 2-ethylhexane, heptane, decane, tridecane, cyclohexane, and the like.

Examples of the unsaturated hydrocarbon include hexene, heptene, cyclohexene, and the like.

Examples of the aromatic hydrocarbon include toluene, xylene, ethylbenzene, decalin, 1,2,3,4-tetrahydronaphthalene, and the like.

Among these, toluene or xylene is preferable.

The hydrocarbon-based solvent is preferably dehydrated in advance. Specifically, the moisture content is preferably 100 ppm by weight or less, particularly preferably 30 ppm by weight or less.

In one embodiment of the present invention, it is preferable that the organic solvent comprises at least one of a nitrile compound and an ether compound.

Examples of the ether compound include tetrahydrofuran, diethyl ether, and the like.

As the nitrile compound, a nitrile compound represented by $R(CN)_n$ is preferable. In the formula, R is an alkyl group having 1 or more and 10 or less carbon atoms or a group containing an aromatic ring having 6 or more and 18 or less ring carbon atoms. n is 1 or 2.

Examples include acetonitrile, propionitrile, 3-chloropropionitrile, benzonitrile, 4-fluorobenzonitrile, tertiary butyronitrile, isobutyronitrile, cyclohexylnitrile, capronitrile, isocapronitrile, malononitrile, and fumarnitrile. Propionitrile, isocapronitrile and isobutyronitrile are preferable.

For example, a nitrile compound is preferable because it is azeotropic with toluene and can be easily removed with toluene from the treated product at the time of drying.

The amount of the nitrile compound and the ether compound comprised in the organic solvent are preferably 0.01 to 5% by weight, more preferably 0.1 to 3% by weight, and particularly preferably 0.3 to 1% by weight.

For the mixing and pulverizing, for example, a pulverizer such as a planetary ball mill, a vibration mill, a rolling mill, or a bead mill, or a kneader such as a uniaxial kneader or a multiaxial kneader can be used.

The raw material mixture obtained by removing a solvent from the slurry after the mixing and pulverizing is mainly composed of fine crystals. By mixing and pulverizing the raw material, a particle-fining of the raw material proceeds, and a raw material mixture composed of fine crystals of each raw material is obtained.

The raw material mixture is heat-treated in a solvent using a pressure-resistant container. Instead of using a pressure-resistant container, the raw material mixture may be subjected to a heat treatment in a solvent under refluxing. As described in Non-Patent Document 2, it was found that, heating accompanied by distilling off a solvent or heating after distilling off a solvent resulted in larger secondary particles of the treated product. On the other hand, in the present embodiment, since the heat treatment is performed without distilling off a solvent, it is possible to prevent aggregation between the treated product, and as a result, it is possible to obtain smaller secondary particles of an argyrodite-type solid electrolyte.

As a solvent used for the heat treatment, a non-polar solvent, a polar solvent, or a mixed solvent thereof exemplified for mixing and pulverizing a raw material such as lithium can be used. Therefore, a slurry in which a raw material mixture as a powder is dispersed in a solvent is heated. The solvent used for the heat treatment may be the same as or different from the solvent used for mixing and pulverizing the raw material. The use of the same solvent is preferable because a step of removing the solvent from the slurry of the raw material mixture after the mixing and pulverizing is unnecessary.

The heating temperature and the heating time in the heat treatment can be adjusted as appropriate in consideration of the composition of the raw material and the like. For example, the heating temperature is preferably 150° C. to 300° C., more preferably 160° C. to 280° C., still more preferably 170° C. to 270° C., and particularly preferably 180° C. to 260° C. By setting the temperature within the above-mentioned temperature ranges, a $PS_4$ structure is formed, and halogen is easily incorporated into the crystal. Since the raw material mixture of fine particles is heat-treated in a solvent, crystals containing a $PS_4$ structure can be formed at a relatively low temperature.

The heating time is preferably 10 minutes to 6 hours, more preferably 10 minutes to 3 hours, and particularly preferably 30 minutes to 2 hours.

The pressure-resistant container used in the heat treatment is not particularly limited, and it is preferable to use an autoclave when the heating temperature exceeds the boiling point of the solvent used. The reflux of the solvent is not particularly limited, and a condenser (e.g., a Dimroth) for cooling the vapor and returning it to the solvent can be used.

In the present embodiment, the treated product preferably comprises a crystal having a $PS_4$ structure. Examples of the crystal having a $PS_4$ structure include a β-$Li_3PS_4$-type crystal structure and a $Li_7PS_6$-type crystal structure. According to the study of the present inventors, it has been found that the specific surface area is reduced when halogen is incorporated and an argyrodite-type crystal structure is generated. In the present embodiment, it is considered that, by heat-treating at a lower temperature to form a $PS_4$ structure, halogen is more likely to be incorporated into the crystal if the time for firing is shorter and an argyrodite-type crystal structure can be obtained before particles grow larger.

It can be confirmed by an X-ray diffraction measurement that the treated product contains a β-$Li_3PS_4$-type crystal structure and/or a $Li_7PS_6$-type crystal structure. Typical peaks of β-$Li_3PS_4$ are 2θ=17.5±1.0 deg, 18.1±1.0 deg, 25.9±1.0 deg, 27.5±1.0 deg, 29.0±1.0 deg, and 29.7±1.0 deg.

Typical peaks of $Li_7PS_6$ are 2θ=15.5±1.0 deg, 17.9±1.0 deg, 25.3±1.0 deg, 29.8±1.0 deg, 31.2±1.0 deg, 36.2±1.0 deg, and 39.5±1.0 deg.

It is preferable that the content ratio of the β-$Li_3PS_4$-type crystal structure with respect to the total crystal structure contained in the treated product be 15% by weight or more. By containing the β-$Li_3PS_4$-type crystal structure in a predetermined content or more, a solid electrolyte having an argyrodite-type crystal structure can be produced while suppressing particle growth. The content ratio of the β-$Li_3PS_4$-type crystal structure is more preferably 20% by weight or more, more preferably 25% by weight or more, and particularly preferably 30% by weight or more. The upper limit of the content ratio of the β-$Li_3PS_4$-type crystal structure may be 100% by weight or less, and may be 90% by weight or less.

The treated product may contain a $Li_7PS_6$-type crystal structure, and the content ratio of the $Li_7PS_6$-type crystal structure with respect to the total crystal structure contained in the treated product may be 10% by weight or more. The content ratio of the $Li_7PS_6$-type crystal structure may be 15% by weight or more, and may be 20% by weight or more. The upper limit of the content ratio of the $Li_7PS_6$-type crystal structure may be 100% by weight or less, and may be 90% by weight or less.

When the treated product contains a β-$Li_3PS_4$-type crystal structure and a $Li_7PS_6$-type crystal structure, the total content ratio of the β-$Li_3PS_4$-type crystal structure and the $Li_7PS_6$-type crystal structure with respect to the total crystal structure contained in the treated product is preferably 50% by weight or more and 100% by weight or less, more preferably 60% by weight or more and 100% by weight or less, and still more preferably 65% by weight or more and 100% by weight or less.

The weight ratio of the β-$Li_3PS_4$-type crystal structure and the $Li_7PS_6$-type crystal structure contained in the treated product "the weight of the β-$Li_3PS_4$-type crystal structure vs the weight of the $Li_7PS_6$-type crystal structure" is preferably 30:70 to 100:0, more preferably 40:60 to 95:5, and still more preferably 50:50 to 90:10.

The content ratio of the β-$Li_3PS_4$-type crystal structure and the $Li_7PS_6$-type crystal structure is the value obtained by Rietveld analysis of the results of X-ray diffraction measurement. The total crystal structure contained in the treated product means all of the crystal structures specified by X-ray diffraction measurement.

In the present embodiment, it is preferable that the specific surface area of the treated product be 15 $m^2/g$ or more. The treated product containing a crystal having a $PS_4$ structure obtained by heating in a solvent has a large specific surface area, and in the subsequent firing, both primary and secondary particles do not grow into larger particles and an argyrodite-type crystal structure can be obtained. A raw material such as halogen is incorporated into the primary particles, and aggregation of the primary particles can also be prevented by heat-treating in a solvent. The specific surface area is more preferably 20 $m^2/g$ or more, and more preferably 30 $m^2/g$ or more.

The specific surface area of the treated product can be controlled, for example, by adjusting the heating temperature or the heating time.

The solvent is removed from the heat-treated slurry to recover the treated product. The method for removing the solvent is not particularly limited, and the solvent can be distilled off under a normal pressure or a reduced pressure. Filtration can also be used in combination for greater productivity.

By firing the treated product, an argyrodite-type solid electrolyte is obtained.

The heating temperature and the heating time in the firing can be adjusted as appropriate in consideration of the composition of the treated product, etc. For example, the heating temperature is preferably 300° C. to 470° C., more preferably more than 300° C. and 460° C. or less, more preferably 320° C. to 450° C., still more preferably 350° C. to 440° C., and particularly preferably 380° C. to 430° C.

The heating time is preferably from 1 minute to 6 hours, more preferably from 1 minute to 2 hours, and particularly preferably from 5 minutes to 1 hour. In the present embodiment, the particles are difficult to grow, and therefore, stable production can be given.

The atmosphere at the time of heating is not particularly limited, and is preferably an atmosphere not under hydrogen sulfide airflow but under an inert gas such as nitrogen, argon, or the like. For the firing step, a firing oven such as a stationary hearth kiln or a rotary kiln of a rotating-type can be used.

Examples of the argyrodite-type crystal structure include the crystal structure disclosed in Patent Document 1, etc. The composition formula includes, for example, $Li_6PS_5X$, $Li_{7-x}PS_{6-x}X_x$ (X=Cl, Br, I, and x=0.0 to 1.8) and the like.

It can be confirmed, for example, by powder X-ray diffraction measurement using CuKα rays, that the produced solid electrolyte has an argyrodite-type crystal structure. The argyrodite-type crystal structure has strong diffraction peaks at 2θ=25.2±1.0 deg and 29.7±1.0 deg. Diffraction peaks of the argyrodite-type crystal structure may appear, for example, at 2θ=15.3±1.0 deg, 17.7±1.0 deg, 31.1±1.0 deg, 44.9±1.0 deg, or 47.7±1.0 deg. The argyrodite-type solid electrolyte may have these peaks.

In the present invention, as long as a solid electrolyte has an X-ray diffraction pattern of an argyrodite-type crystal structure as described above, an amorphous component may be contained in a part thereof. Moreover, a crystal structure other than the argyrodite-type crystal structure, and raw materials other than for the argyrodite-type crystal structure may be contained.

EXAMPLES

The present invention is described below in more detail by Examples.

The evaluation method is as follows.

(1) Volume-Based Mean Particle Size (Hereinafter Referred to as the Laser Diffraction D50)

A measurement was performed with a laser diffraction/scattering type particle size distribution measurement device (manufactured by HORIBA, LA-950V2 model LA-950W2).

A mixture of dehydrated toluene (Wako Pure Chemical Industries, Ltd., Special Grade) and tertiary butyl alcohol (Wako Pure Chemical Industries, Ltd., Special Grade) in a weight ratio of 93.8:6.2 was used as a dispersion medium. 50 mL of the dispersing medium was poured into a flow cell of the device, and circulated, Thereafter, an object to be measured was added to the dispersing medium, a resulting product was ultrasonically treated, and then, a particle size distribution was measured. The addition amount of the measurement object was adjusted so that the red-light transmittance (R) corresponding to the particle concentration was 80 to 90% and the blue-light transmittance (B) was 70 to 90% on the measurement screen defined by the device. The calculation conditions used were 2.16 as the value of the refractive index of the measurement object and 1.49 as the value of the refractive index of the dispersion medium, respectively. In the setting of the distribution form, the particle size calculation was performed by fixing the number of repetitions to 15 times.

(2) Mean Particle Size of the Solid Electrolyte Determined from Image Processing of Electron Microscope (Hereinafter Referred to as the Image Analysis d50)

The solid electrolyte produced in each Example was observed for morphology by scanning electrons microscope (SEM). From the obtained SEM image, a square region containing 200 or more particles was selected (particles in contact with the outer frame of the square were not counted), and 200 or more particles were randomly extracted. The particle size distribution was determined by image-processing software ImageJ, and d50 was defined as the mean particle size. In the present application, since the laser diffraction D50 is larger than the mean particle size of the image analysis d50, it is considered that the image analysis d50 corresponds to the primary particle size, and the laser analysis D50 corresponds to the secondary particle size (the particle size of the aggregated particles in which the primary particles aggregate).

(3) Ionic Conductivity Measurement

The argyrodite-type solid electrolyte produced in each Example was filled in a tablet molding machine, and a pressure of 22 MPa was applied to form a molded body. Carbon was placed on both sides of the molded body as an electrode, and the pressure was applied again by a tablet molding machine, whereby producing a molded body for measurement (diameter: about 10 mm, thickness: 0.1 to 0.2 cm). The ionic conductivity of this molded body was measured by AC impedance measurement. The conductivity values at 25° C. were adopted.

(4) X-Ray Diffraction (XRD) Measurement

The powder of the argyrodite-type solid electrolyte produced in each Example was filled into a groove with a diameter of 20 mm and a depth of 0.2 mm, and the sample was leveled with glass. This sample was measured with a Kapton Film for XRD such that the sample was not exposed to the air. The 2θ position of the diffraction peaks was determined by Rietveld analysis using the XRD-analysis program Z-Rietveld.

The measurement was conducted using a powder X-ray diffraction measurement device D2 PHASER of BRUKER corporation under the following conditions.

Tube voltage: 30 kV
Tube current: 10 mA
X-ray wavelength: Cu-Kα (1.5418 Å)
Optical system: concentration technique
Slit configuration: solar slit 4°, divergence slit 1 mm, K β filter (Ni plate) is used
Detector: semiconductor detector
Measurement range: 2θ=10 to 60 deg
Step width, scan speed: 0.05 deg, 0.05 deg/sec In the analysis of the peak position for confirming the presence of the crystal structures from the results of measurement, the baseline was corrected by combining the auto-estimation value of 800 points and the quartic Legendre orthogonal polynomial by the Sonneveld method using the XRD analysis program Z-Rietveld, the peak shift value was corrected using $Z1+Z2 \times \cos\theta + Z3 \times \sin 2\theta$ with each coefficient Z1 to Z3, and the Rietveld analysis was performed using the Spilit-Psedo-Voigt function. When the weighted confidence factor $R_{wp}$ and index $\chi^2$ of the results of analysis satisfied the following formulas (1) and (2), the ratio of each crystal structure was quantitatively evaluated using the following formula (3), respectively.

[Formula 1]

$$5 > R_{wp} = \left\{ \frac{\sum_i Wi[yi - fi(x)]^2}{\sum_i Wiyi^2} \right\}^{\frac{1}{2}} \quad (1)$$

In the formula, Wi is a statistical weight, yi is an observed intensity, and fi(x) is a theoretical diffraction intensity (analytical intensity).

[Formula 2]

$$10 > \chi^2 = \left\{ \frac{\sum_i Wi[yi - fi(x)]^2}{N - P} \right\}^{\frac{1}{2}} \quad (1)$$

In the formula, N is the number of total data and P is the number of refined parameters,

[Formula 3]

$$Wm = \frac{SmZmMmVm}{\sum_{k=1}^{m} SkZkMkVk} \quad (3)$$

In the formula, $W_m$ is the weight fraction of the m-th phase, $S_k$ is the scale factor of each phase, $Z_k$ is the number of chemical formula units contained in the unit cell, $M_k$ is the molecular weight, and $V_k$ is the unit cell volume.

In the evaluation, the treated product was analyzed as the crystal structure of all crystal structure species specified by XRD (β-$Li_3PS_4$, $Li_7PS_6$, $Li_2S$, LiCl and LiBr) (five phases). When LiCl and LiBr were partially dissolved in solid solution as the product phases, the formula (3) was evaluated as a total of five phases, assuming as the two phases of LiCl and LiBr. When LiCl and LiBr were completely dissolved in a solid solution into one phase, the formula (3) was evaluated as a total of four phases assuming as one phase of LiCl. Further, in the evaluation of the argyrodite type solid electrolyte, it was assumed that the argyrodite-type crystal structure produced had a composition of $Li_{5.4}PS_{4.4}Cl_{1.0}Br_{0.6}$ in accordance with the addition ratio, and the formula (3) was evaluated in a total of two phases assuming that the solid solution of LiCl and LiBr, which are impurity phases, was one phase of LiCl.

(5) Specific Surface Area

The specific surface area was measured by a nitrogen method using a gas adsorption amount measuring device (AUTOSORB6 (manufactured by Sysmex Corporation)).

Production Example 1

Production of Lithium Sulfide ($Li_2S$)

$Li_2S$ was produced and purified as described below.

As a water-insoluble medium, toluene (manufactured by Sumitomo Corporation) was dehydrated, and 303.8 kg of toluene having a moisture content of 100 ppm, which was measured by a Karl Fisher moisture meter, was added to a 500 L reaction kiln made of stainless steel under a nitrogen stream. Then, 33.8 kg of anhydrous lithium hydroxide (manufactured by Honjo Chemical Co., Ltd.) was addition, and the mixture was kept at 95° C. while being stirred at 131 rpm by a twin star stirring blade.

Hydrogen sulfide (manufactured by Sumitomo Seika Co., Ltd.) was blown into the slurry at a feed rate of 100 L/min, and the temperature was raised to 104° C. An azeotropic gas of water and toluene was continuously discharged from the reaction kiln. This azeotropic gas was condensed by an out-of-system condenser to achieve dehydration. In the meantime, the same amount of toluene as distilling toluene was continuously supplied, and the reaction liquid level was maintained in constant.

The moisture content in the condensate gradually decreased, and no distillation of water was observed 24 hours after the introduction of hydrogen sulfide. During the reaction, the solid was dispersed in toluene and stirred, and there was no moisture separated from toluene.

After that, hydrogen sulfide was switched to nitrogen and flowed at 100 L/min for 1 hour.

The obtained solid was filtered and dried to obtain $Li_2S$ as a white powder. The laser-diffraction D50 of $Li_2S$ was 412 μm.

Example 1

(A) Pulverizing Step $Li_2S$ obtained in Production Example 1 was pulverized in a nitrogen atmosphere using a pin mill (100UPZ manufactured by Hosokawa Micron Co., Ltd.) having a fixed quantity machine. The addition rate was 80 g/min, and the rotation speed of the disk was 18000 rpm.

Similarly, $P_2S_5$ (manufactured by Thermophos, laser diffraction D50=125 μm), LiBr (manufactured by Honjo Chemical, laser diffraction D50=38 μm), and LiCl (manufactured by Sigma Aldrich, laser diffraction D50=308 μm) were each pulverized by a pin mill. The addition rate of $P_2S_5$ was 140 g/min, the addition rate of LiBr was 230 g/min, and the addition rate of LiCl was 250 g/min. The rotation speed of each disk was 18000 rpm.

The laser diffraction D50 of $Li_2S$ after pulverizing was 7.7 μm, the laser diffraction D50 of $P_2S_5$ after pulverizing was 8.7 μm, the laser diffraction D50 of LiBr after pulverizing was 5.0 μm, and the laser diffraction D50 of LiCl after pulverizing was 10 μm, respectively.

(B) Preparation of the Raw Material Mixture

In a glove box in a nitrogen atmosphere, each compound pulverized in the above-mentioned pulverizing step (A) was weighed so that the molar ratio of $Li_2S:P_2S_5:LiBr:LiCl=47.5:12.5:15.0:25.0$ and a total of each compound is 110 g. End each compound was put into a glass container, and the glass container was coarsely mixed by shaking the glass container.

110 g of the crude mixed raw material was dispersed in a mixed solvent of 1140 mL of dehydrated toluene (manufactured by Wako Pure Chemical Industries, Ltd.) and 7 mL of dehydrated isobutyronitrile (manufactured by Xida Chemical Industries, Ltd.) under a nitrogen atmosphere to obtain a slurry of about 10% by weight. The slurry was pulverized using a bead mill (LMZ015, manufactured by Ashizawa Finetech Co.) while maintaining the slurry in a nitrogen atmosphere to obtain a raw material mixture. Specifically, 456 g of zirconia beads having a diameter of 0.5 mm were used as the pulverizing medium, and the bead mill was operated under the conditions of a peripheral speed of 12 m/s and a flow rate of 500 mL/min. The slurry was put into the mill and circulated for 1 hour. The treated slurry was placed in a nitrogen-substituted Schlenk bottle and dried under a reduced pressure to obtain a raw material mixture.

(C) Heat-Treating Step 30 g of the raw material mixture obtained in the above (B) was dispersed in 300 mL of ethylbenzene (Wako Pure Chemical Industries, Ltd.) to obtain a slurry. This slurry was put into an autoclave (capacity: 1000 mL, made of SUS316) equipped with a stirrer and an oil bath for heating, and the slurry was heat-treated at 200° C. for 2 hours while stirring at a rotational speed of 200 rpm. After the treatment, the slurry was dried under a reduced pressure, and the solvent was distilled off to obtain a treated product.

The specific surface area, the mean particle size (the laser diffraction D50), and the content ratio of a β-$Li_3PS_4$-type crystal structure and a $Li_7PS_6$-type crystal structure of the treated product were evaluated. The results are shown in Table 1. As a result of XRD measurement of the raw material mixture, peaks other than the raw material were not observed.

Figure 2:
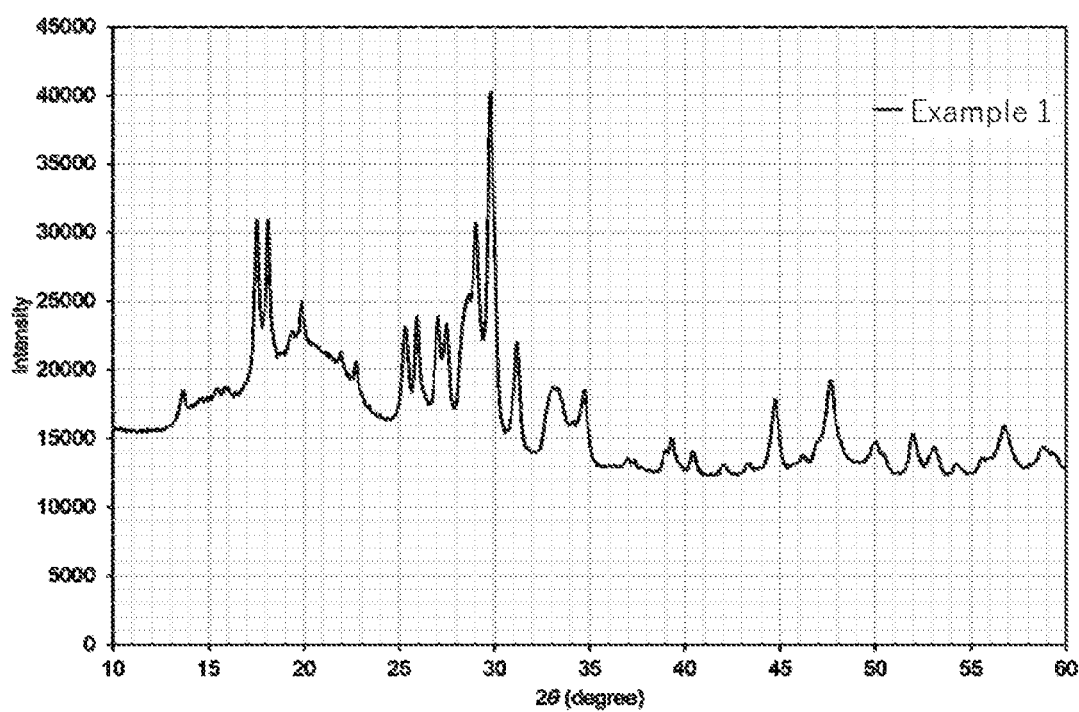
FIG. 2 is an XRD pattern of the treated product produced in Example 1.

The XRD pattern of the treated product is shown in FIG. 2.

|  | Specific surface area [m²/g] | Mean particle size Laser diffraction D50 [μm] | Content ratio of β-$Li_3PS_4$-type crystal structure [% by weight] | Content ratio of $Li_7PS_6$-type crystal structure [% by weight] | Total content ratio [% by weight] of β-$Li_3PS_4$ and $Li_7PS_6$ and Ratio therebetween |
|---|---|---|---|---|---|
| Example 1 | — | 4.4 | 59.3 | 21.9 | 81.2<br>73.0:27.0 |
| Example 2 | 45.7 | 4.7 | 52.2 | 13.7 | 65.9<br>79.2:20.8 |
| Example 3 | 45.7 | 4.7 | 52.2 | 13.7 | 65.9<br>79.2:20.8 |

-continued

| | Specific surface area [m²/g] | Mean particle size Laser diffraction D50 [μm] | Content ratio of β-Li₃PS₄-type crystal structure [% by weight] | Content ratio of Li₇PS₆-type crystal structure [% by weight] | Total content ratio [% by weight] of β-Li₃PS₄ and Li₇PS₆ and Ratio therebetween |
|---|---|---|---|---|---|
| Example 4 | 37.2 | 4.7 | 52.2 | 13.7 | 65.9 |
| | | | | | 79.2:20.8 |
| Example 5 | 19.2 | 2.7 | 41.6 | 23.5 | 65.1 |
| | | | | | 63.9:36.1 |
| Comp. Ex. 1 | 6.7 | 43.3 | 49.2 | 14.2 | 63.4 |
| | | | | | 77.6:22.4 |
| Raw material mixture | — | — | 0 | 0 | 0 |

(D) Firing Step

The treated product obtained in the above (C) was heated in an electric oven (F-1404-A, manufactured by Tokyo Glass Instruments Co., Ltd.) in a glove box in a nitrogen atmosphere. Specifically, a sagger made of Al₂O₃ (999-60S, manufactured by Tokyo Glass Instruments Co., Ltd.) was placed in the electric oven, and the temperature was raised from room temperature to 380° C. in 1 hour and held at 380° C. for 1 hour or more. Thereafter, the door of the electric oven was opened, 1 g of the treated product was quickly poured into the sagger, and then the door was immediately closed and heated for 10 minutes. Thereafter, the sagger was taken out from the electric oven and slowly cooled to obtain a solid electrolyte.

In the XRD pattern of the solid electrolyte, peaks derived from an argyrodite-type crystal structure were observed at 2θ=25.5±1.0 deg and 29.9±1.0 deg, etc. The peaks derived from an argyrodite-type crystal structure were observed in all of the Examples and Comparative Examples described later.

The solid electrolyte was evaluated for the mean particle size (the laser diffraction D50) and the ionic conductivity. The results are shown in Table 2. In Examples 1 to 5, a solid electrolyte having a mean particle size (the image analysis d50) of 1 μm or less and a content ratio of LiX (X=Cl, Br) as a residual raw material of less than 1% by weight was obtained.

TABLE 2

| | Mean particle size Laser diffraction D50 [μm] | Ionic conductivity [mS/cm] |
|---|---|---|
| Example 1 | 6.2 | — |
| Example 2 | 5.4 | 6.7 |
| Example 3 | 5.8 | 5.2 |
| Example 4 | 6.4 | 7.4 |
| Example 5 | 5.0 | 6.5 |
| Comp. Ex. 1 | 75.6 | 8.2 |
| Comp. Ex. 2 | 73.7 | 8.8 |
| Comp. Ex. 3 | 77.7 | 10.8 |
| Comp. Ex. 4 | 79.4 | 8.8 |

Example 2

In Example 1(B), the slurry after treatment with the bead mill was used in the heat-treating step without drying. The slurry was put into an autoclave and heat-treated at 180° C. for 2 hours. Except for the foregoing, a solid electrolyte was produced and evaluated in the same manner as in Example 1. The results are shown in Tables 1 and 2.

Figure 3:
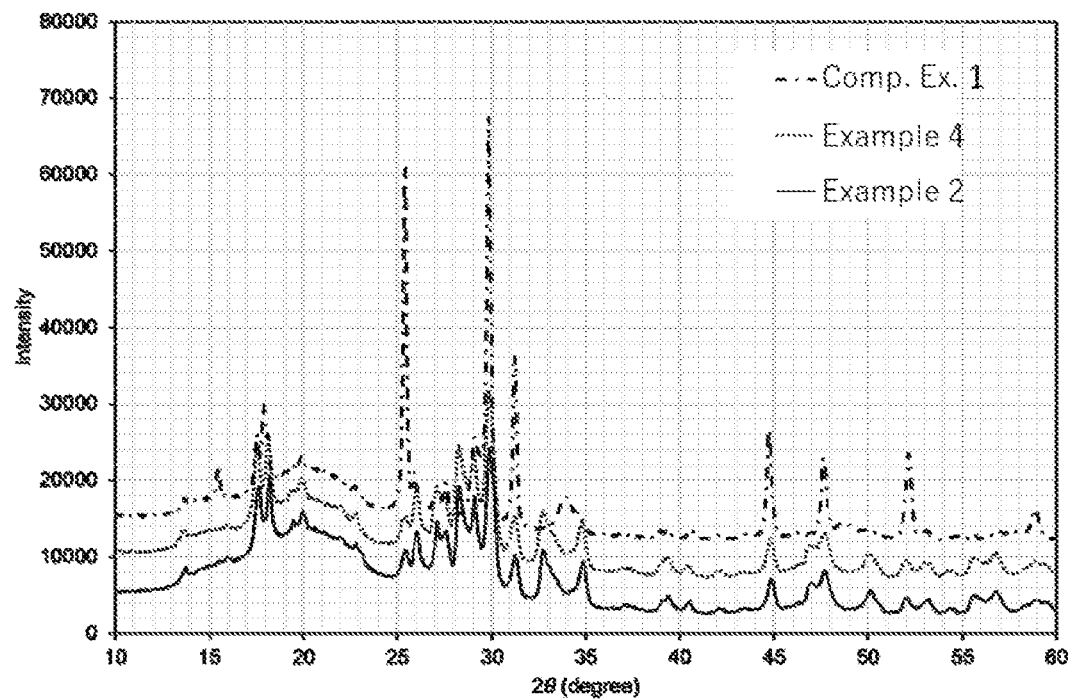
FIG. 3 is an XRD pattern each of the treated products produced in Examples 2 and 4 and Comparative Example 1.

The XRD pattern of the treated product is shown in FIG. 3. The XRD pattern of the solid electrolyte is shown in FIG. 4.

Example 3

A solid electrolyte was produced and evaluated in the same manner as in Example 2 except that the heating time was changed from 10 minutes to 1 hour in Example 1(D). The results are shown in Tables 1 and 2.

Figure 4:
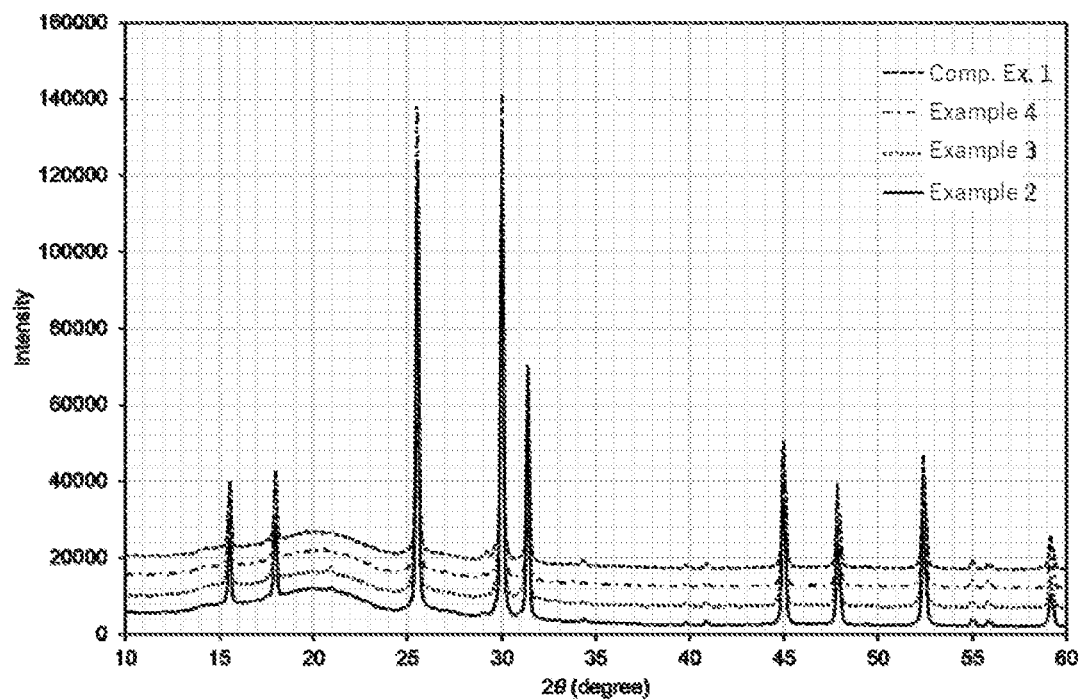
FIG. 4 is an XRD pattern each of the solid electrolytes produced in Examples 2 to 4 and Comparative Example 1.

The XRD pattern of the solid electrolyte is shown in FIG. 4.

Example 4

A solid electrolyte was produced and evaluated in the same manner as in Example 3 except that the slurry after the heat treatment was filtered off through a membrane filter made of polytetrafluoroethylene (PTFE) having a pore size of 0.5 μm to recover a treated product. The results are shown in Tables 1 and 2.

The XRD pattern of the treatment is shown in FIG. 3. The XRD pattern of the solid electrolyte is shown in FIG. 4.

Example 5

In Example 1 (B), tridecane (Wako Pure Chemical Industries, Ltd.) was used instead of dehydrated toluene. The slurry after treatment with the bead mill was used in the heat treatment step without drying. The slurry was heated in an oil bath at 200° C. for 2 hours under a normal pressure using a three-necked flask equipped with a stirrer and a Dimroth as a heat treatment. After the heat treatment, the slurry was filtered off through a PTFE membrane filter having a pore size of 0.5 μm, and the resulting solid component was washed with 10 mL of normal hexane, and then dried under a reduced pressure to obtain a treated product. Except for the foregoing, a solid electrolyte was produced and evaluated in the same manner as in Example 1. The results are shown in Tables 1 and 2.

Figure 5:
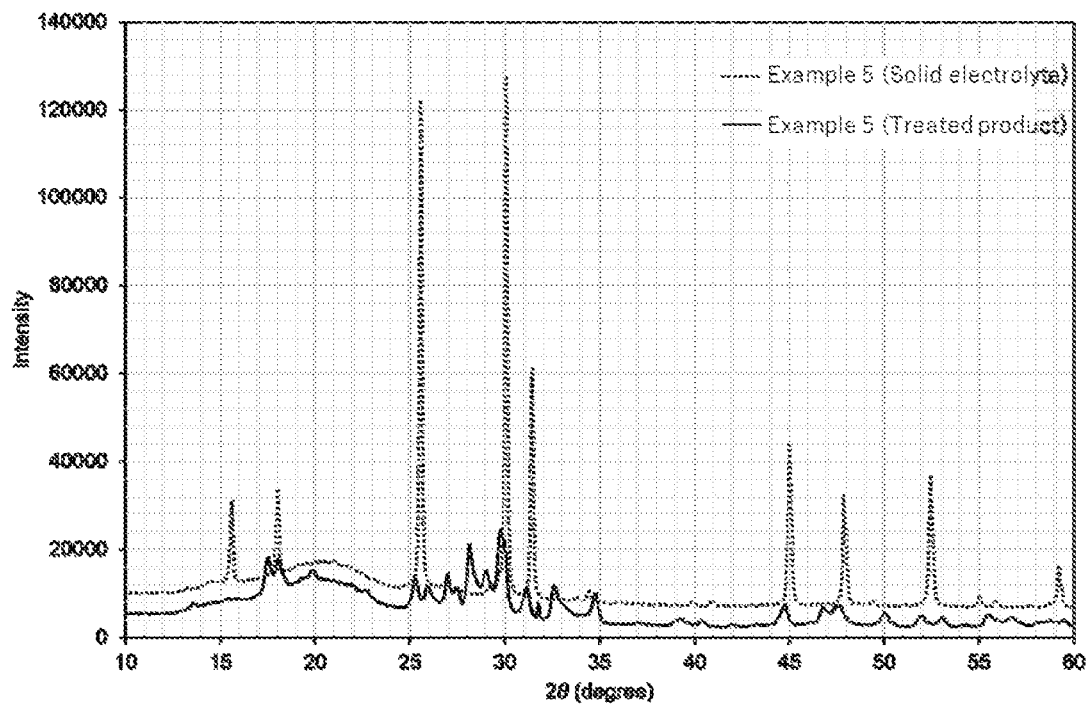
FIG. 5 is an XRD pattern each of the treated product and the solid electrolyte produced in Example 5.

The XRD patterns of the treated product and the solid electrolyte are shown in FIG. 5.

Comparative Example 1

Heat treatment was performed as follows.

2 g of the raw material mixture obtained in Example 1 (B) (vacuum dried product) was filled in a tanmann tube (PT2, made by Tokyo Glass Instruments Co., Ltd.) in a glove box under a nitrogen atmosphere, and the tanmann tube was placed into an electric oven (F-1404-A, made by Tokyo Glass Instruments Co., Ltd.) in an glove box under a nitrogen atmosphere and heat-treated. Specifically, the temperature was raised from room temperature to 200° C. in 1 hour, and held at 200° C. for 2 hours. Thereafter, the tanmann tube was gradually cooled to obtain a treated product.

Except for the foregoing, a solid electrolyte was produced and evaluated in the same manner as in Example 1. The results are shown in Tables 1 and 2. The XRD pattern of the treated product is shown in FIG. 3. The XRD pattern of the solid electrolyte is shown in FIG. 4.

Although an argyrodite-type solid electrolyte is obtained, it can be confirmed that the mean particle size (the laser diffraction D50) is increased as compared with Examples. The mean particle size (the image analysis d50) was 1 μm or less.

Figure 6:
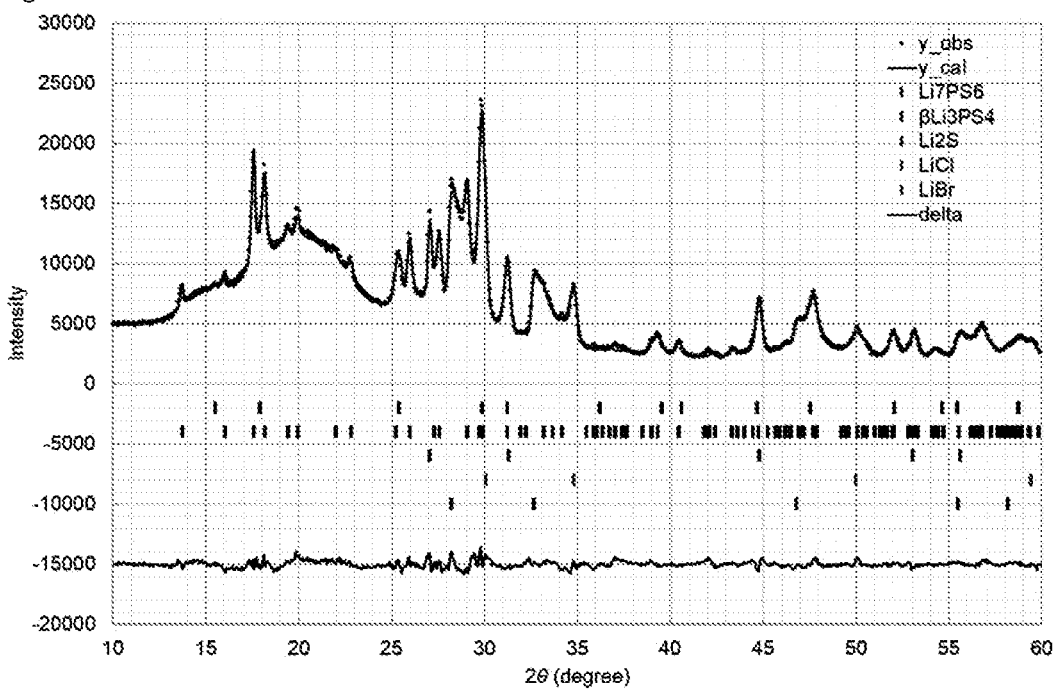
FIG. 6 is a diagram showing the result of Rietveld analysis of an XRD data of the treated product of Comparative Example 1.

FIG. 6 shows the results of Rietveld analysis of the XRD data of the treated product. As shown in FIG. 6, it was confirmed that the crystal structure contained a β-$Li_3PS_4$-type crystal structure and a $Li_7PS_6$-type crystal structure. The content ratio of each crystal structure is shown in Table 1. As a result of XRD measurement of the raw material mixture, peaks other than the raw material were not observed.

Comparative Example 2

Figure 7:
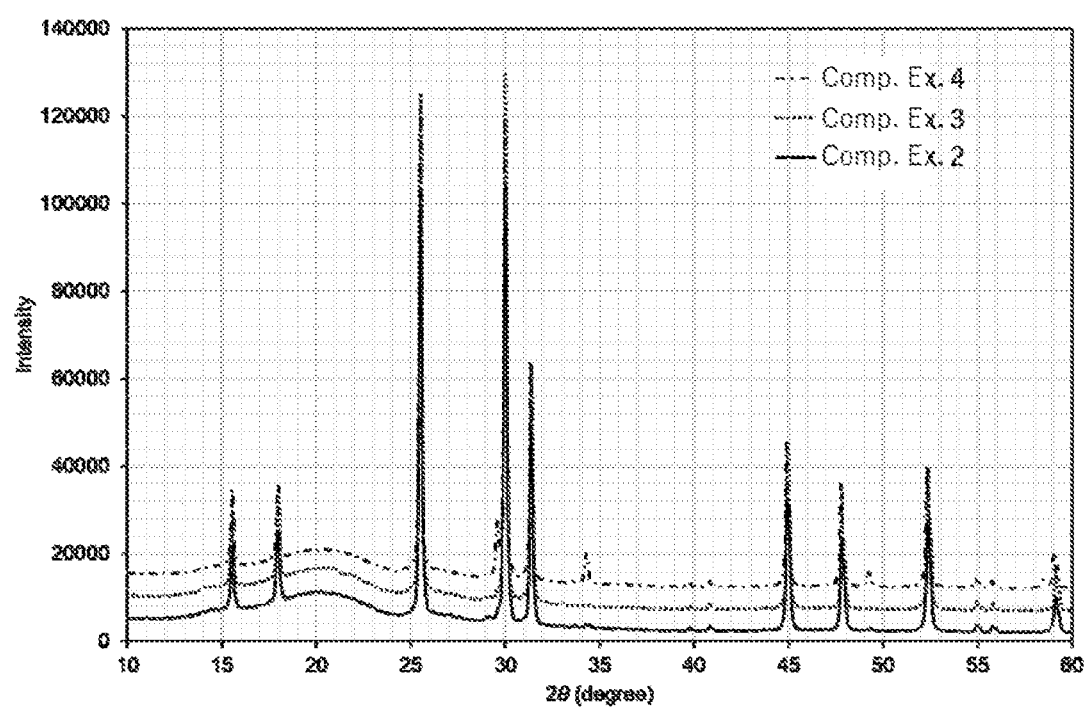
FIG. 7 is an XRD pattern each of the solid electrolytes produced in Comparative Examples 2 to 4.

A solid electrolyte was produced and evaluated in the same manner as in Example 1, except that the raw material mixture obtained in Example 1(B) (dried under reduced pressure) was fired without heat treatment. The results are shown in Tables 1 and 2. The XRD pattern of the solid electrolyte is shown in FIG. 7.

Although an argyrodite-type solid electrolyte can be obtained, it can be confirmed that the mean particle size is increased as compared with Examples.

Comparative Example 3

A solid electrolyte was produced and evaluated in the same manner as in Comparative Example 2 except that the heating time was changed from 10 minutes to 1 hour in the firing. The results are shown in Tables 1 and 2. The XRD pattern of the solid electrolyte is shown in FIG. 7.

Although an argyrodite-type solid electrolyte can be obtained, it can be confirmed that the mean particle size is increased as compared with Examples.

Comparative Example 4

In Example 1(B), the slurry after treatment with the bead mill was filtered off with a PTFE membrane filter having a pore size of 0.5 μm, and the solid components were collected. The solid component was heated at 100° C. for 2 hours to obtain a raw material mixture. A solid electrolyte was produced and evaluated in the same manner as in Comparative Example 3 except that the raw material mixture was used. The results are shown in Tables 1 and 2. The XRD pattern of the solid electrolyte is shown in FIG. 7.

Although an argyrodite-type solid electrolyte was obtained, the mean particle size was increased compared with the Examples, and peaks of lithium halide as a residual raw material were observed.

From Table 2, it can be confirmed that the laser diffraction D50 of the solid electrolyte is extremely small and the ionic conductivity is sufficiently high as 5 mS/cm or more as compared with Comparative Examples. Further, it is can be confirmed that the primary particles are small, and aggregation of the primary particles is also suppressed. As understood from Examples 3 and 4, the growth of the primary particles is suppressed even if the heating time of the firing is lengthened. Therefore, by performing heat treatment in a solvent, a solid electrolyte having an argyrodite-type crystal structure with fine particles and a less amount of the residual raw material can be more stably produced.

While embodiments and/or examples of the invention have been described in some detail above, those skilled in the art will readily make many changes to these illustrative embodiments and/or examples without materially departing from the novel teachings and advantages of the invention. Accordingly, many of these modifications are within the scope of the present invention.

The documents described in the specification and the specification of Japanese application(s) on the basis of which the present application claims Paris convention priority are incorporated herein by reference in its entirety.

The invention claimed is:

1. A method for producing a solid electrolyte having an argyrodite-type crystal structure, the method comprising:
   heat-treating a raw material mixture comprising lithium, sulfur, phosphorus and halogen in a solvent using a pressure-resistant container or under refluxing;
   removing the solvent; and
   firing a treated product obtained by the heat treatment.

2. The method for producing a solid electrolyte according to claim 1, wherein a heating temperature of the heat treatment is 150° C. or more and 300° C. or less.

3. The method for producing a solid electrolyte according to claim 1, wherein a heating temperature of the firing is 300° C. or more and 470° C. or less.

4. The method for producing a solid electrolyte according to claim 1, wherein two or more raw materials comprising one or more selected from the group consisting of lithium, sulfur, phosphorus and halogen are mixed and pulverized in a solvent to obtain the raw material mixture.

5. The method for producing a solid electrolyte according to claim 4, wherein the solvent comprises a hydrocarbon-based solvent and at least one of a nitrile compound and an ether compound.

6. The method for producing a solid electrolyte according to claim 1, wherein the treated product comprises a crystal having a $PS_4$ structure.

7. The method for producing a solid electrolyte according to claim 6, wherein the crystal having a $PS_4$ structure is one or more selected from a β-$Li_3PS_4$-type crystal structure and a $Li_7PS_6$-type crystal structure.

8. The method for producing a solid electrolyte according to claim 7, wherein the treated product comprises 15% by weight or more of the β-$Li_3PS_4$-type crystal structure.

9. The method for producing a solid electrolyte according to claim 7, wherein the treated product comprises 10% by weight or more of the $Li_7PS_6$-type crystal structure.

10. The method for producing a solid electrolyte according to claim 7, wherein a total content ratio of the β-$Li_3PS_4$-type crystal structure and the $Li_7PS_6$-type crystal structure relative to a total crystal structure comprised in the treated product is 50% by weight or more and 100% by weight or less.

11. The method for producing a solid electrolyte according to claim 1, wherein the pressure-resistant container is an autoclave.

12. The method for producing a solid electrolyte according to claim 1, wherein a specific surface area of the treated product is 15 $m^2/g$ or more.

* * * * *